G. A. DANIELSON & M. L. HIRSCH.
ATTACHMENT FOR CAR BRAKES.
APPLICATION FILED AUG. 9, 1917.

1,276,625.

Patented Aug. 20, 1918.

INVENTORS
GUST A. DANIELSON
MORRIS L. HIRSCH
By W. Keene ATTORNEY.

UNITED STATES PATENT OFFICE.

GUST A. DANIELSON AND MORRIS L. HIRSCH, OF LOS ANGELES, CALIFORNIA.

ATTACHMENT FOR CAR-BRAKES.

1,276,625.

Specification of Letters Patent. Patented Aug. 20, 1918.

Application filed August 9, 1917. Serial No. 185,387.

*To all whom it may concern:*

Be it known that we, GUST A. DANIELSON and MORRIS L. HIRSCH, citizens of the United States, residing in Los Angeles and State of California, have invented a new and useful Improvement in Attachments for Car-Brakes, of which the following is a specification.

This invention relates to attachments for car brakes and the principal object thereof is to provide a device which may be readily attached to present car brake equipment by simply eliminating the common pawl.

It is also an object to provide a simple spring actuated mechanism that will require no manual movement to lock the pawl.

A still further object is to provide a car brake attachment that will be protected from accidental injury, as well as to a sufficient extent from inclement weather.

Figure 1:
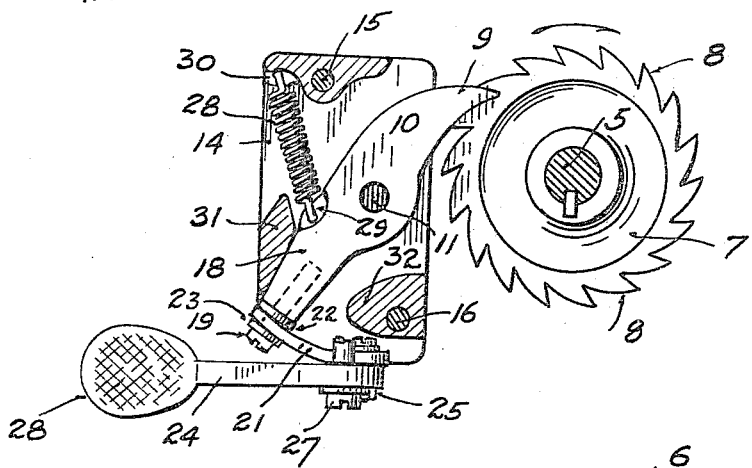

In the drawing accompanying this specification, Figure 1 is a plan view of the device, the top being broken away to more clearly show the details.

Figure 2:
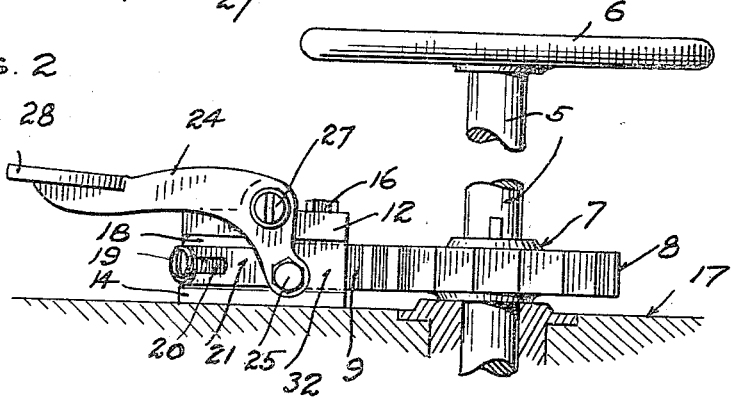
Figure 3:
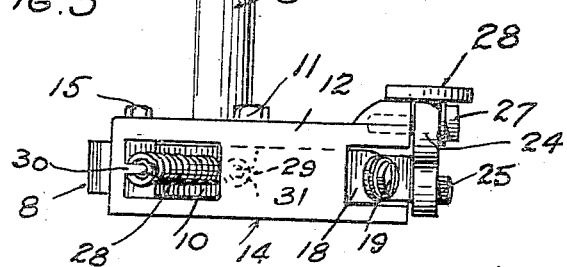

Fig. 2 is a side elevation, and Fig. 3 is an elevation of the structure of the side facing the operator of the brake.

Numerous devices have been designed and patented to accomplish the results specified above, but they have either been too complicated, or so expensive as to prohibit their practical use and have required a greater or less amount of machining and alteration of the present equipment.

The applicant has overcome the above mentioned difficulties and as stated, has provided a simple, practical and efficient brake lock attachment.

In the drawings numerals are used to designate the same parts in the different views, numeral 5 designates brake rod, provided with a common handle or wheel 6, the rod having keyed thereon a common type of ratchet wheel 7, provided with wide and saw-tooth shaped teeth 8 which are adapted to be engaged by the point 9 of the pawl 10.

This pawl 10 is pivoted upon a central bolt or pin 11 which passes through both the top 12 and the bottom 14 of the preferred form of casting. This bolt 11, together with the bolts 15 and 16 securing the casting with its attachments to the floor or platform 17 in the position most convenient to the right foot of the operator, this device being shown as right handed. The pawl 10 is also provided with a rearwardly disposed portion 18, the outer end of which is preferably bored and threaded to receive the threaded pin 19 which is passed through a slot 20 in the connecting bar 21, suitable washers 22 and 23 being provided to eliminate friction. This pin 19 may be provided with a shoulder so as to form a sort of stud and the slot 20 is provided so that in the movement of the pawl, the foot lever 24 secured to the other end of the connecting bar 21 by the pin or bolt 25, will not be moved up and down at each jump of the pawl from one tooth to the other in the winding operation of the brake.

The foot lever 24 is pinned to the top portion of the attachment by stud pin 27, the lever being provided with a foot pedal 28 to receive the pressure of the operator's foot in releasing the pawl 10.

To hold the pawl in positive engagement a spring 28 is provided that hooks into a web 29 on the rearwardly disposed face of the pawl, the other end of the spring being secured at the most remote corner in a web 30. This spring holding the pawl in positive engagement with the stop 31, a second stop 32 oppositely disposed in the casting, preventing unnecessary movement of the pawl when it is desired to release the tension on the brake.

In the operation of the device the brake chain is wound up in the usual manner on the brake rod by turning the wheel 6 clockwise, the pawl jumping from notch to notch formed by the teeth 8 on the ratchet 7, and said pawl positively locking therein in, by the tension of the spring and the tendency of the pawl to pull into contact with the ratchet and the backing of the same against stop 31, the operator's foot during this operation being firmly planted upon the platform so that there is less danger of injury or falling. The pedal 28 practically remains in the same position due to more or less friction since the pin 19 slides in the slot 20, so there is no necessity of feeling around for the pedal or looking for the same.

When it is desired to release the brake, the operator's toe is lifted on the side adjacent to the pedal 28 and the toe placed thereon without entirely removing the foot from the platform, and a slight pressure downward pulls the rear of the pawl toward the stop 32, releasing the point 9, permitting the brake to unwind as desired.

What we claim is:

1. A device of the class described in combination with a brake rod and ratchet wheel, of a base plate, provided with stops and means of securing same adjacent to said rod and ratchet wheel, a spring operated pawl mounted on said plate, a connecting rod, an operating lever and means to connect said connecting rod and said lever in operative relation to said plate and said pawl.

2. A device of the class described, in combination with a brake rod and ratchet wheel, of a casting provided with means of securing same to the platform adjacent to said ratchet, and a resiliently operated pawl pivoted in said casting with a point in operative relation to said ratchet, the oppositely disposed end being provided with a pin, a connecting rod adapted to connect with said pin; a foot lever provided with a pedal and arm, and pivotally connected to said casting and means to connect said connecting rod to said arm on said foot lever.

In witness that we claim the foregoing we have hereunto subscribed our names this 1st day of August, 1917.

GUST A. DANIELSON.
MORRIS L. HIRSCH.

Copies of this patent may be obtained for five cents each, by addressing the "Commissioner of Patents, Washington, D. C."